United States Patent
Oh

[19]

[11] Patent Number: 6,000,500
[45] Date of Patent: Dec. 14, 1999

[54] OIL PUMP FOR COMPRESSOR

[75] Inventor: Il-Kyo Oh, Suwon, Rep. of Korea

[73] Assignee: SamSung Electroincs Co., Ltd., Suwon, Rep. of Korea

[21] Appl. No.: 08/989,134

[22] Filed: Dec. 11, 1997

[30] Foreign Application Priority Data

May 15, 1997 [KR] Rep. of Korea ............... 97-18799

[51] Int. Cl.[6] .................................................. F01M 1/00
[52] U.S. Cl. ..................................... 184/6.16; 417/372
[58] Field of Search ......................... 184/26, 31, 6.16, 184/6.18; 417/902, 372; 418/55.1

[56] References Cited

U.S. PATENT DOCUMENTS

| | | | |
|---|---|---|---|
| 2,440,812 | 5/1948 | Simpson | 184/6 |
| 3,858,685 | 1/1975 | Bono | 184/6.16 |
| 4,209,080 | 6/1980 | Douglas | 184/6.16 |
| 5,088,579 | 2/1992 | Kim et al. | 184/6.16 |
| 5,377,781 | 1/1995 | Yun | 184/6.23 |

*Primary Examiner*—Tamara L. Graysay
*Assistant Examiner*—David Fenstermacher
*Attorney, Agent, or Firm*—Burns, Doane, Swecker & Mathis, L.L.P.

[57] ABSTRACT

A compressor has a piston attached to an eccentric part of a rotary shaft for being reciprocated to compress refrigerant. In order to provide lubricating oil to the shaft, an oil paddle is mounted in a hole of the eccentric part for pumping oil from the bottom of the compressor. The paddle includes a longitudinally extending gap rendering the paddle flexible so that either end thereof can be mounted in the hole. The paddle also includes slots formed in upper and lower ends of the paddle, respectively, in diametrically opposing relationship to the gap. The lower slot is submersed in the oil to reduce the amount of oil that is pumped and thereby reducing generated noise.

3 Claims, 4 Drawing Sheets

OIL PUMP FOR COMPRESSOR

BACKGROUND OF THE INVENTION (1) Field of the Invention

The present invention generally relates to a hermetic reciprocating compressor used in an air conditioner, a refrigerator, etc. More particularly, it relates to an oil pump for a compressor having an improved construction to reduce the noise produced during operation.

(2) Description of the Prior Art

A conventional compressor includes a housing formed by upper and lower shells 1 and 2 sealing and protecting internal components, a stator 3 installed in upper and lower shells 1 and 2, and provided with power to create a magnetic field, a rotor 5 mounted within stator 3 and rotating by the action of the magnetic field, as shown in FIGS. 1 and 2.

Within rotor 5 is installed a rotation shaft 9 to rotate with rotor 5. A connecting rod 11 is installed at an eccentric part of one end of rotation shaft 9 for converting the rotating motion of rotation shaft 9 into a reciprocating motion. A piston 13 is installed at one end of connecting rod 11 to reciprocate according to the reciprocating motion of connecting rod 11. A cylinder block 15 is provided to the outside of piston 13 to make a space in which a refrigerant is compressed, simultaneously with guiding piston 13. A valve plate 21 with a suction hole 17 and an exhaust hole 19 is mounted on cylinder block 15, and a cylinder head 27 with a suction chamber 23 and an exhaust chamber 25 at one side of valve plate 21.

A gasket 29 is interposed between valve plate 21 and cylinder head 27 for forming a seal, and an oil paddle 30 is provided to an eccentric part 9a of rotation shaft 9 to pump up oil flowing in the bottom of lower shell 2 by centrifugal force generated by the rotation of oil paddle 30. A hole 9b is also formed at eccentric part 9a of rotation shaft 9. Oil paddle 30 has a gap 31 so as to fit into hole 9b, and an oil scattering part 33 is provided to the middle of 11 paddle 30. A push fit portion 35 is formed on the upper part of oil paddle 30, and an oil dipper 36 which is immersed in the oil of lower shell 2 is provided to the lower part of oil paddle 30. Gap 31 is formed to face a centripetal point when rotation shaft 9 turns. Reference numerals 37 and 39 denote a suction muffler sending the refrigerant to cylinder block 15, and a connecting pipe transmitting the refrigerant of suction muffler 37 to cylinder block 15.

Once power is applied to the conventional compressor, a magnetic field is created in the vicinity of stator 3. As rotor 5 rotates by the action of this magnetic field, rotation shaft 9, integrally formed with rotor 5, also rotates, and connecting rod 11 disposed on one end of stator 5 reciprocates rectilinearly, thus making piston 13, provided to the inside of cylinder block 15, reciprocate rectilinearly.

The refrigerant, introduced to suction chamber 23 of cylinder head 27 through suction muffler 37 and connecting tube 39, flows into cylinder block 15 pushing intake valve 31 provided to suction hole 17 of-valve plate 21. Cylinder block 15 becomes compressed as piston 13 is moved, and the refrigerant in cylinder block 15 flows to the outside through exhaust hole 19 of valve plate 21. As push fit portion 35 of oil paddle 30, provided to one eccentric part of rotation shaft 9, rotates in a circle as rotation shaft 9 turns, oil dipper 36 of oil paddle 30 rotates about the center of rotation shaft 9, thus pumping out the oil flowing in lower shell 2 by centrifugal force produced by oil paddle 30.

According to the conventional compressor, push fit portion 35 of oil paddle 30 has directivity, and it must be properly positioned so as to fit into rotation shaft 9 in assemblage. Oil paddle 30 being locked rotates about rotation shaft 9 to pump the oil out, and an abnormal noise is produced by the wave motion of the oil surface, thus increasing the compressor noise.

SUMMARY OF THE INVENTION

Accordingly, the present invention is directed to an oil pump for a compressor that substantially obviates one or more of the problems due to limitations and disadvantages of the related art.

It is an object of the present invention to provide an oil pump for a compressor having an improved oil paddle, thus reducing the abnormal noise of the compressor and facilitating assemblage.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is disclosed an oil pump for a compressor having an oil paddle mounted in a hole of an eccentric part of a rotation shaft for pumping out an oil stored in the bottom of the compressor. The paddle includes a longitudinal gap rendering the paddle flexible so that either end of the paddle can be mounted in the hole. Slots are formed on upper and lower ends of the oil paddle in diametrically opposite relationship to the gap. The lower slot is submersed in the oil to reduce the amount of oil that is pumped and thereby reduce the generated noise.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings.

In the drawings.

DETAILED DESCRIPTION OF PREFERRED EMBODIMENT

Figure 1:
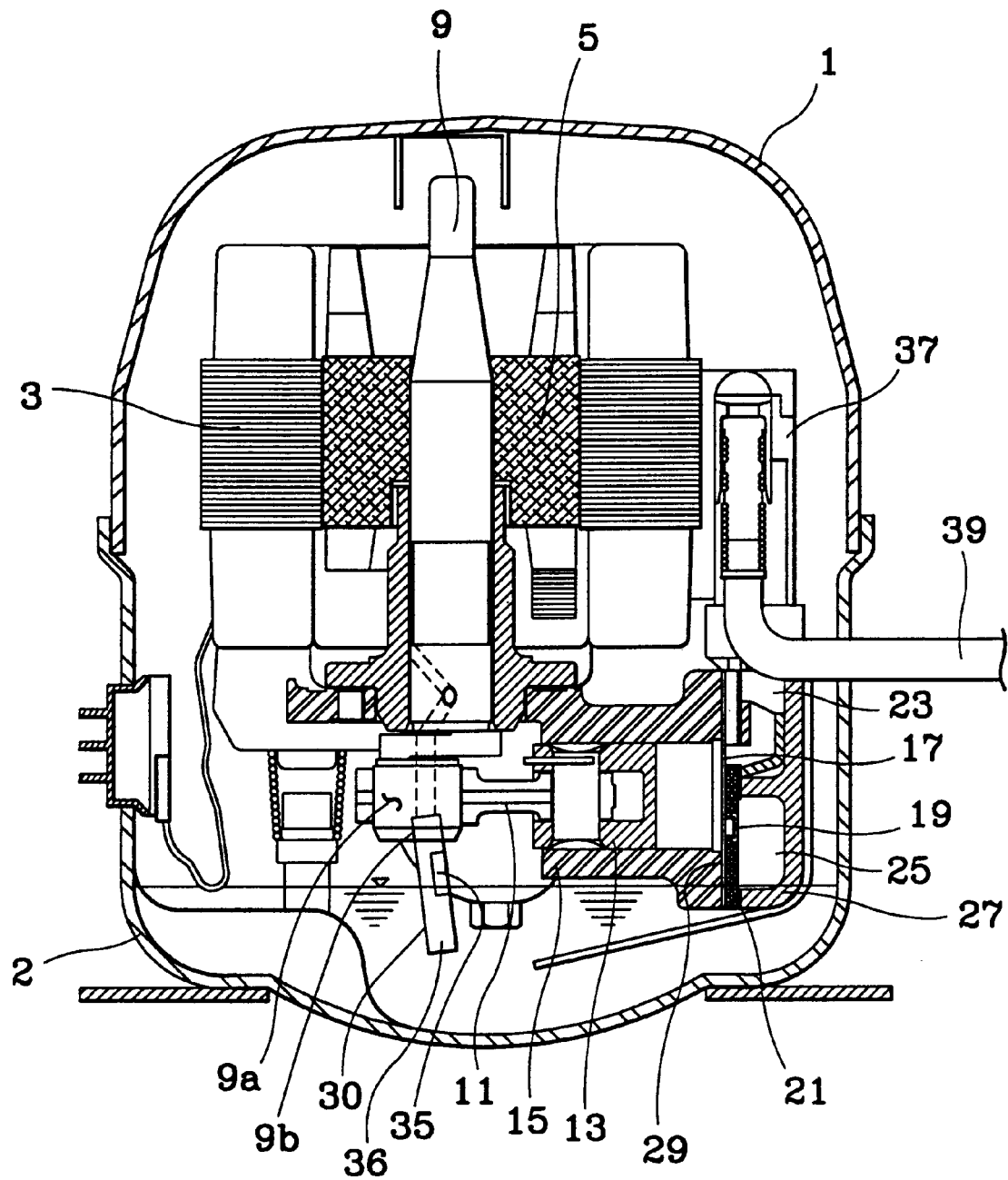
FIG. 1 is a longitudinal-sectional view of a conventional compressor.
Figure 2:
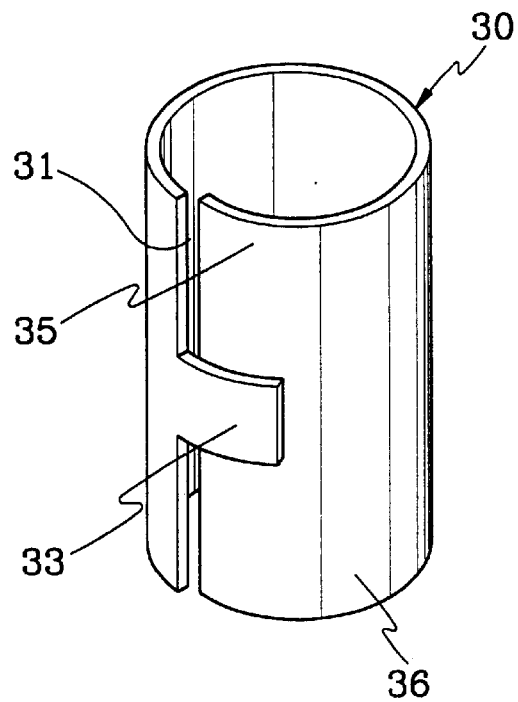
FIG. 2 is an enlarged-perspective view of an oil paddle of the conventional compressor.

Reference will now be made in detail to the preferred embodiments of the present invention, examples of which are illustrated in the accompanying drawings. Similar reference numerals denote similar reference parts throughout the specification and drawings.

Figure 4:
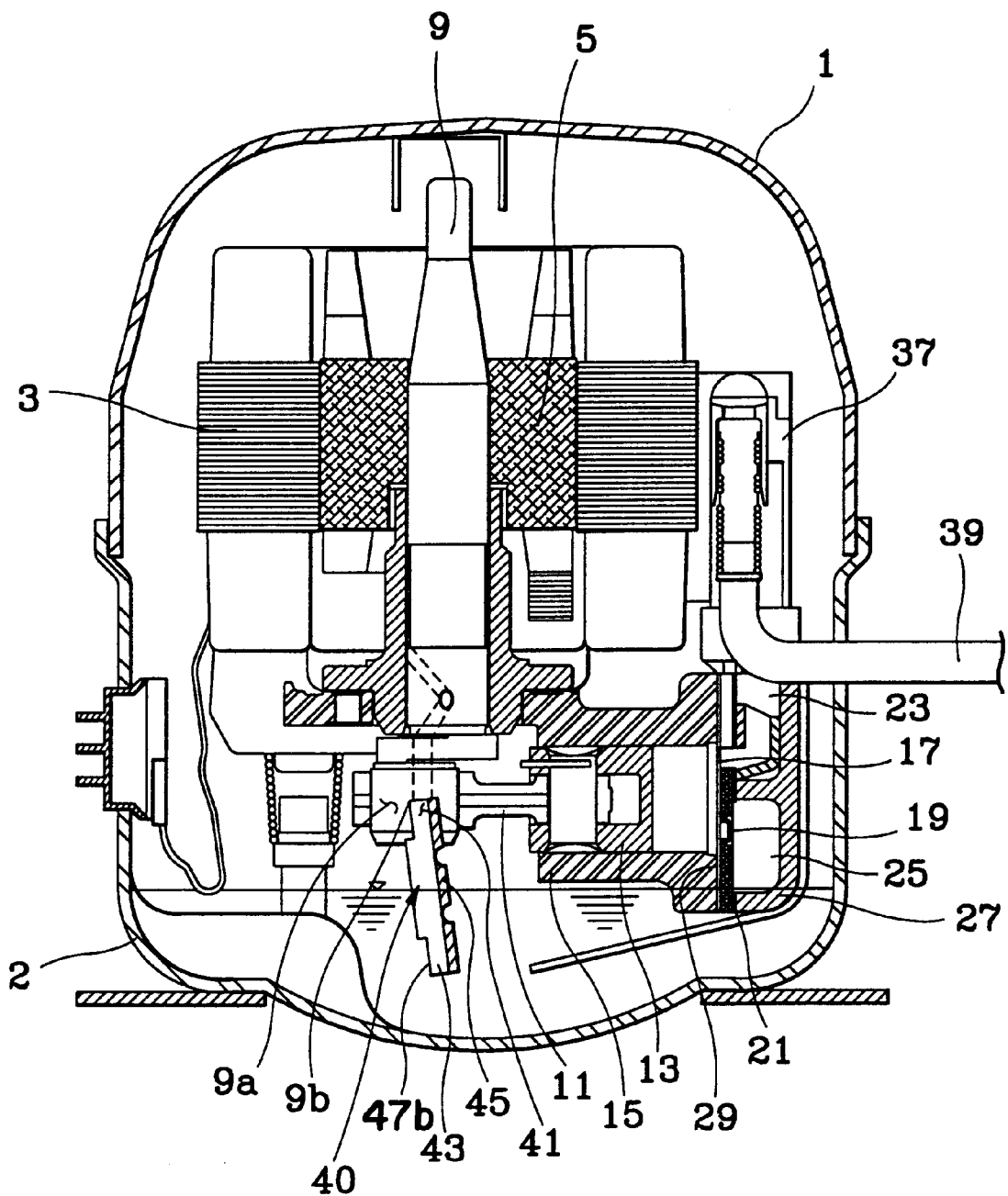
FIG. 4 is a longitudinal-sectional view of a compressor in accordance with the present invention.
Figure 5:
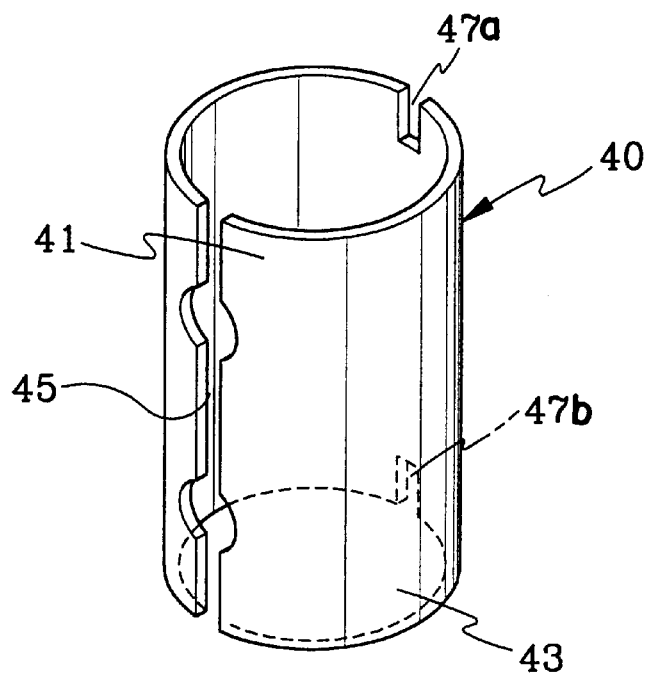
FIG. 5 is an enlarged-perspective view of the compressor in accordance with the present invention.

As shown in FIGS. 4 and 5, a generally cylindrical oil paddle 40 is provided to one eccentric part 9a of a rotation shaft 9 to pump up oil by centrifugal force generated by the rotation of oil paddle 40. A push fit portion 41 is formed on the upper part of oil paddle 40 to fit into a hole 9b made on eccentric part 9a of rotation shaft 9. An oil dipper 43 is formed on the lower part of oil paddle 40 to be immersed in the oil. A longitudinal gap 45 is formed in the outer surface of oil paddle 40 to make the paddle flexible and able to be forced into hole 9b of rotation shaft 9.

Slots 47a, 47b are each formed on upper and lower ends of oil paddle 40 on which the centrifugal force of oil paddle 40 is acting. Slots 47a, 47b are disposed opposite to each other to enable either end of the paddle 40 to be inserted into the hole 9b, whereby the lower one of the slots 47b constitutes an exposed slot, and the upper slot 47a constitutes a covered slot. The exposed slot reduces the amount of oil being pumped, thus keeping the oil surface more constant than in the prior art. Each of slots 47a, 47b is of a predetermined size in order not to cause a change in the amount of the oil pumped if the paddle 40 were inverted. The exposed slot 47b is positioned to be submersed in the oil. Slots 47a, 47b are in a rectangular or round shape, and the slots 47a, 47b are formed on predetermined points on which the centrifugal force is applied.

Push fit portion 41 and oil dipper 43 are disposed oppositely with respect to each other, and either the portion 41 or the oil dipper 43 may be inserted into the hole 9b. The amount of the oil being pumped is significantly reduced by the exposed slot 47b to enhance the reliability of the compressor. More specifically, the upper slot 47a makes it easier to fit oil paddle 40 into hole 9b. These slots 47a, 47b are each formed in diametrically opposite relation to the gap 45.

Hole 9b is of a size smaller than oil paddle 40's outer diameter so that oil paddle 40 is forced into hole 9b by the action of the tension of gap 45, and oil paddle 40 is positioned to face a centripetal point when rotation shaft 9 turns.

The following description relates to the operation and effect of the present invention.

Once power is applied to a stator 3 of the compressor, a magnetic field is created in the vicinity of stator 3. As rotor 5 is rotated by the action of this magnetic field, rotation shaft 9, integrally formed with rotor 5, makes a rotating motion. Push fit portion 41 of oil paddle 40, inserted into hole 9b at eccentric part 9a's side, rotates in a circle and oil dipper 43 of oil paddle 40 turns about rotation shaft 9, thus pumping the oil by centrifugal force produced by the rotation of oil paddle 40.

Since slot 47a formed on the upper end of oil paddle 40 is covered by being inserted into hole 9b made on eccentric part 9a of rotation shaft 9, it has no effect on the amount of oil being pumped, whereas the exposed slot 47b which is submersed in the oil reduces the amount of oil being pumped, to keep a waveform of the oil surface more constant than in the prior art, thus preventing an abnormal noise from being created by the oil.

Figure 3:
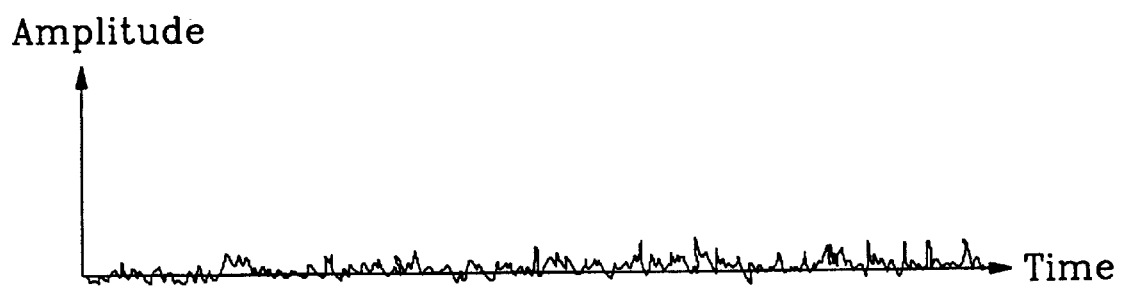
FIG. 3 shows a waveform of an oil surface created when using the conventional oil paddle.
Figure 6:
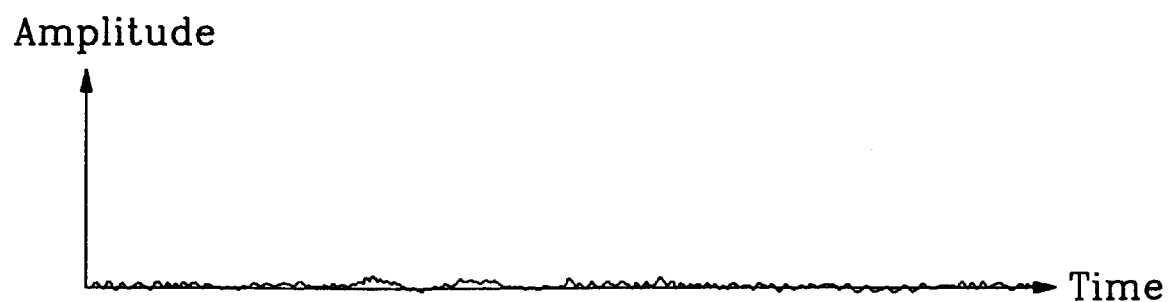
FIG. 6 shows a waveform of an oil surface created when using the conventional oil paddle.

FIG. 3 depicts a waveform of the oil surface produced when using the conventional oil paddle, and FIG. 6 shows a waveform of the oil surface created when using the inventive oil paddle. The waveform of the oil surface created when using the inventive oil paddle 40 is more constant than the waveform due to the conventional oil paddle.

According to the inventive oil pump for a compressor, the slots are formed at the upper and lower ends of the oil paddle and the lower slot is submersed in the oil to reduce the amount of oil that is pumped and keep the waveform of the oil surface relatively constant, thereby precluding an abnormal noise due to the oil.

It will be apparent to those skilled in the art that various modifications and variations can be made in the oil pump for a compressor of the present invention without departing from the spirit or scope of the invention. Thus, it is intended that the present invention cover the modifications and variations of this invention provided they come within the scope of the appended claims and their equivalents.

What is claimed is:

1. A compressor comprising:
   a housing containing a quantity of lubricating oil in a bottom portion thereof;
   a rotary shaft including an eccentric part having a hole formed therein;
   an oil paddle mounted in the hole of the eccentric part for pumping oil in response to rotation of the shaft, the oil paddle being hollow and generally cylindrical and comprising:
      a longitudinally extending gap rendering the paddle flexible and enabling either one of first and second ends thereof to be mounted in the hole, and
      first and second slots extending longitudinally in the first and second ends, respectively, in substantially diametrically opposed relationship to the gap, the second end constituting a lower end of the paddle, and the second slot being submersed in the oil for reducing the amount of oil that is pumped and thereby reducing noise generated as the paddle moves through the oil.

2. The compressor according to claim 1 wherein the first and second slots are of identical size whereby the reduction of the amount of oil that is pumped is the same regardless of which end of the paddle is mounted in the hole.

3. The compressor according to claim 1 wherein each of the slots is of rectangular shape.

* * * * *